(12) United States Patent
Andersen et al.

(10) Patent No.: US 8,182,777 B2
(45) Date of Patent: May 22, 2012

(54) SMALL PORE MOLECULAR SIEVE SUPPORTED COPPER CATALYSTS DURABLE AGAINST LEAN/RICH AGING FOR THE REDUCTION OF NITROGEN OXIDES

(75) Inventors: Paul Joseph Andersen, Plymouth Meeting, PA (US); Hai-Ying Chen, Conshohocken, PA (US); Joseph Michael Fedeyko, Glen Mills, PA (US); Erich Weigert, Newtown Square, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/334,259

(22) Filed: Dec. 22, 2011

(65) Prior Publication Data

US 2012/0093702 A1 Apr. 19, 2012

Related U.S. Application Data

(63) Continuation of application No. 13/189,981, filed on Jul. 25, 2011, now Pat. No. 8,101,147, which is a continuation of application No. 12/762,971, filed on Apr. 19, 2010, now Pat. No. 7,998,443.

(60) Provisional application No. 61/312,832, filed on Mar. 11, 2010, provisional application No. 61/170,358, filed on Apr. 17, 2009.

(51) Int. Cl.
*B01D 53/56* (2006.01)
*B01D 53/94* (2006.01)

(52) U.S. Cl. ............... 423/213.2; 423/239.2; 60/301

(58) Field of Classification Search ............... 423/213.2, 423/239.2; 60/301
See application file for complete search history.

(56) References Cited

U.S. PATENT DOCUMENTS 7,998,443 B2 * 8/2011 Andersen et al. ........... 423/213.2
2008/0241060 A1 * 10/2008 Li et al. .......................... 423/700
* cited by examiner

*Primary Examiner* — Timothy Vanoy
(74) *Attorney, Agent, or Firm* — Jimmie Johnson

(57) ABSTRACT

A method of using a catalyst comprises exposing a catalyst to at least one reactant in a chemical process. The catalyst comprises copper and a small pore molecular sieve having a maximum ring size of eight tetrahedral atoms. The chemical process undergoes at least one period of exposure to a reducing atmosphere. The catalyst has an initial activity and the catalyst has a final activity after the at least one period of exposure to the reducing atmosphere. The final activity is within 30% of the initial activity at a temperature between 200 and 500° C.

7 Claims, 4 Drawing Sheets

SMALL PORE MOLECULAR SIEVE SUPPORTED COPPER CATALYSTS DURABLE AGAINST LEAN/RICH AGING FOR THE REDUCTION OF NITROGEN OXIDES

CROSS-REFERENCE TO RELATED APPLICATIONS

This application is continuation of U.S. patent application Ser. No. 13/189,981 (granted as U.S. Pat. No. 8,101,147), filed Jul. 25, 2011, which is a continuation application of U.S. patent application Ser. No. 12/762,971 (granted as U.S. Pat. No. 7,998,443), filed Apr. 19, 2010, which claims priority to U.S. Provisional Application No. 61/170,358, filed Apr. 17, 2009, and U.S. Provisional Application No. 61/312,832, filed Mar. 11, 2010, the disclosures of all of which are incorporated herein by reference in their entireties for all purposes.

FIELD OF THE INVENTION

The present invention relates to small pore molecular sieve supported copper catalysts that are durable after being exposed to a reducing atmosphere, particularly after high temperature exposure.

BACKGROUND OF THE INVENTION

Selective catalytic reduction (SCR) of $NO_X$ by nitrogenous compounds, such as ammonia or urea, has developed for numerous applications including for treating industrial stationary applications, thermal power plants, gas turbines, coal-fired power plants, plant and refinery heaters and boilers in the chemical processing industry, furnaces, coke ovens, municipal waste plants and incinerators, and a number of vehicular (mobile) applications, e.g., for treating diesel exhaust gas.

Several chemical reactions occur in an $NH_3$ SCR system, all of which represent desirable reactions that reduce $NO_X$ to nitrogen. The dominant reaction is represented by reaction (1).

$$4NO + 4NH_3 + O_2 \rightarrow 4N_2 + 6H_2O \quad (1)$$

Competing, non-selective reactions with oxygen can produce secondary emissions or may unproductively consume ammonia. One such non-selective reaction is the complete oxidation of ammonia, shown in reaction (2).

$$4NH_3 + 5O_2 \rightarrow 4NO + 6H_2O \quad (2)$$

Also, side reactions may lead to undesirable products such as $N_2O$, as represented by reaction (3).

$$4NH_3 + 4NO + 3O_2 \rightarrow 4N_2O + 6H_2O \quad (3)$$

Catalysts for SCR of $NO_X$ with $NH_3$ may include, for example, aluminosilicate molecular sieves. One application is to control $NO_X$ emissions from vehicular diesel engines, with the reductant obtainable from an ammonia precursor such as urea or by injecting ammonia per se. To promote the catalytic activity, transition metals may be incorporated into the aluminosilicate molecular sieves. The most commonly tested transition metal molecular sieves are Cu/ZSM-5, Cu/Beta, Fe/ZSM-5 and Fe/Beta because they have a relatively wide temperature activity window. In general, however, Cu-based molecular sieve catalysts show better low temperature $NO_X$ reduction activity than Fe-based molecular sieve catalysts.

In use, ZSM-5 and Beta molecular sieves have a number of drawbacks. They are susceptible to dealumination during high temperature hydrothermal ageing resulting in a loss of acidity, especially with Cu/Beta and Cu/ZSM-5 catalysts. Both beta- and ZSM-5-based catalysts are also affected by hydrocarbons which become adsorbed on the catalysts at relatively low temperatures and are oxidized as the temperature of the catalytic system is raised, generating a significant exotherm, which can thermally damage the catalyst. This problem is particularly acute in vehicular diesel applications where significant quantities of hydrocarbon can be adsorbed on the catalyst during cold-start; and Beta and ZSM-5 molecular sieves are also prone to coking by hydrocarbons.

In general, Cu-based molecular sieve catalysts are less thermally durable, and produce higher levels of $N_2O$ than Fe-based molecular sieve catalysts. However, they have a desirable advantage in that they slip less ammonia in use compared with a corresponding Fe-molecular sieve catalyst.

WO 2008/132452 discloses a method of converting nitrogen oxides in a gas to nitrogen by contacting the nitrogen oxides with a nitrogenous reducing agent in the presence of a zeolite catalyst containing at least one transition metal, wherein the zeolite is a small pore zeolite containing a maximum ring size of eight tetrahedral atoms, wherein the at least one transition metal is selected from the group consisting of Cr, Mn, Fe, Co, Ce, Ni, Cu, Zn, Ga, Mo, Ru, Rh, Pd, Ag, In, Sn, Re, Ir and Pt.

WO 2008/106518 discloses a combination of a fiber matrix wall flow filter and a hydrophobic chabazite molecular sieve as a SCR catalyst on the fiber matrix wall flow filter. The filter purportedly achieves improved flexibility in system configuration and lower fuel costs for active regeneration. Such active regeneration would likely encompass exposure to lean atmospheric conditions. The reference, however, does not contemplate subjecting the filter to reducing conditions. The reference also fails to disclose or appreciate maintaining the durability of a catalyst after being exposed to such a reducing atmosphere.

SUMMARY OF THE INVENTION

According to one embodiment of the present invention, a method of using a catalyst comprises exposing a catalyst to at least one reactant in a chemical process. The catalyst comprises copper and a small pore molecular sieve having a maximum ring size of eight tetrahedral atoms. Preferably, the catalyst is a copper promoted small pore molecular sieve, i.e., a small pore molecular sieve loaded with copper. The chemical process undergoes at least one period of exposure to a reducing atmosphere. The catalyst has an initial activity and the catalyst has a final activity after the at least one period of exposure to the reducing atmosphere. The final activity is within 30% of the initial activity at a temperature between 200 and 500° C.

According to another embodiment of the present invention, a method of using a catalyst comprises exposing a catalyst to at least one reactant comprising nitrogen oxides in a chemical process comprising exhaust gas treatment. The catalyst comprises copper and a small pore molecular sieve having a maximum ring size of eight tetrahedral atoms selected from the group of Framework Type Codes consisting of CHA, LEV, ERI and DDR. The chemical process undergoes at least one period of exposure to a reducing atmosphere. The catalyst has an initial activity, and the catalyst has a final activity after the at least one period of exposure to the reducing atmosphere. The final activity is within 10% of the initial activity at a temperature between 250 and 350° C.

BRIEF DESCRIPTION OF THE DRAWINGS

In order that the invention may be more fully understood, reference is made to the following drawing by way of illustration only, in which.

DETAILED DESCRIPTION OF THE INVENTION

Figure 1:
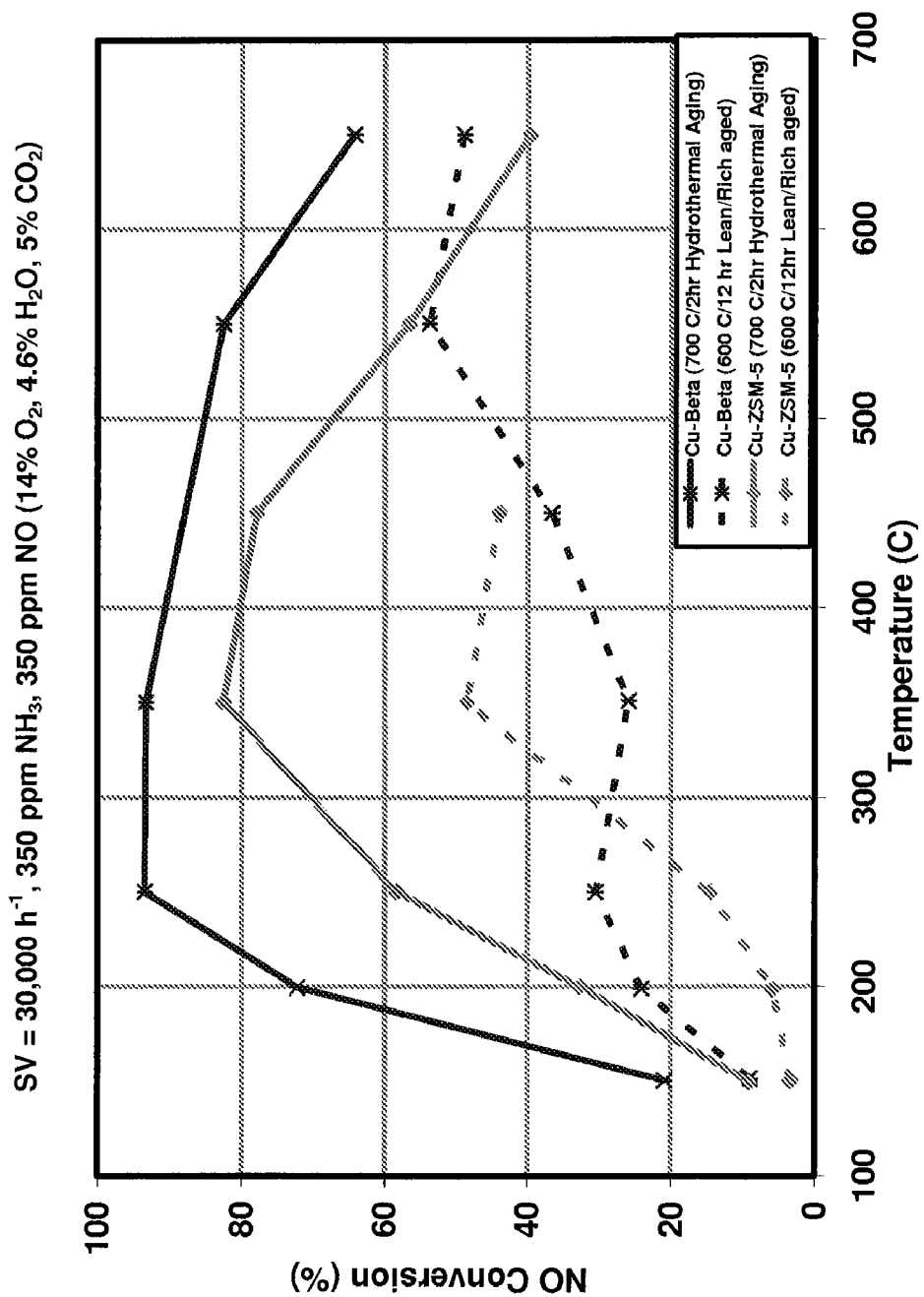
FIG. 1 is a graph illustrating $NO_X$ conversion of medium pore and large pore molecular sieve supported copper catalysts after lean hydrothermal aging and lean/rich cycle aging.

A method of treating $NO_X$ in an exhaust gas of a lean burn internal combustion engine is to store the $NO_X$ from a lean gas in a basic material and then to release the $NO_X$ from the basic material and reduce it periodically using a rich gas. The combination of a basic material (such as an alkali metal, alkaline earth metal or a rare earth metal), and a precious metal (such as platinum), and possibly also a reduction catalyst component (such as rhodium) is typically referred to as a $NO_X$ adsorber catalyst (NAC), a lean $NO_X$ trap (LNT), or a $NO_X$ storage/reduction catalyst (NSRC). As used herein, $NO_X$ storage/reduction catalyst, $NO_X$ trap, and $NO_X$ adsorber catalyst (or their acronyms) may be used interchangeably.

Under certain conditions, during the periodically rich regeneration events, $NH_3$ may be generated over a $NO_X$ adsorber catalyst. The addition of a SCR catalyst downstream of the $NO_X$ adsorber catalyst may improve the overall system $NO_X$ reduction efficiency. In the combined system, the SCR catalyst is capable of storing the released $NH_3$ from the NAC catalyst during rich regeneration events and utilizes the stored $NH_3$ to selectively reduce some or all of the $NO_X$ that slips through the NAC catalyst during the normal lean operation conditions. As used herein, such combined systems may be shown as a combination of their respective acronyms, e.g., NAC+SCR or LNT+SCR.

The combined NAC+SCR system imposes additional requirements on the SCR catalyst component. Namely, besides having good activity and excellent thermal stability, the SCR catalyst has to be stable against lean/rich excursions. Such lean/rich excursions not only may occur during the regular NAC regeneration events, but also may happen during the NAC desulfation events. During the NAC desulfation events, the SCR catalyst may be exposed to temperatures much higher than it would be exposed to during the regular $NO_X$ regeneration events. Therefore, a good SCR catalyst that is suitable for the NAC+SCR systems needs to be durable after being exposed to a reducing atmosphere at high temperature. Although the present invention is described herein with particular emphasis on the SCR embodiment, it is contemplated that the present invention may encompass any catalysts which lose activity when exposed to a reducing atmosphere.

Catalysts are often unstable when exposed to a reducing atmosphere, more particularly a high temperature reducing atmosphere. For example, copper catalysts are unstable during repeated lean/rich high temperature excursions, e.g., as is often encountered in vehicle exhaust gas or an exhaust gas treatment system. The reducing atmosphere occurs in the rich phase of a lean/rich excursion cycle. The reducing atmosphere conditions, however, can occur in a variety of environments including but not limited to environments typical for the regeneration or the desulfation of a $NO_X$ adsorber catalyst, and for the active regeneration of a catalyzed soot filter, etc. Thus, as used herein, a reducing atmosphere is net reducing, for example, an exhaust gas having a lambda value of less than 1 (e.g., derived from an air/fuel ratio less than stoichiometric). Contrastingly, a non-reducing atmosphere is net oxidizing, e.g., having a lambda value greater than 1 (e.g., derived from an air/fuel ratio greater than stoichiometric).

Without wishing to be bound to a particular theory, it was believed prior to discovery of the present invention that molecular sieve supported copper catalysts would not maintain stability or activity when exposed to a reducing atmosphere (especially a reducing atmosphere encountered in a repeated lean/rich cycle excursions) because when exposed to the reducing atmosphere, the copper catalysts lost their activity. This loss of activity was suspected to be due to copper migration, sintering, and/or reduced copper dispersion. Surprisingly, we discovered in the present invention that small pore molecular sieve-supported copper catalysts maintained their catalytic activity even though the medium and large pore molecular sieve supported copper catalysts could not. It is believed that small pore molecular sieves provide a restriction on the copper from migrating out of the framework, sintering, losing copper dispersion, and beneficially resulting in an improved stability and activity of the catalyst. The medium and large pore molecular sieves, however, do not maintain their stability and activity when exposed to a reducing atmosphere possibly because of the effects of copper migration, sintering, and/or reduced copper dispersion.

According to one embodiment of the present invention, a method of using a catalyst comprises exposing a catalyst to at least one reactant in a chemical process. The catalyst comprises copper and a small pore molecular sieve having a maximum ring size of eight tetrahedral atoms. The chemical process undergoes at least one period of exposure to a reducing atmosphere. The catalyst has an initial activity and the catalyst has a final activity after the at least one period of exposure to the reducing atmosphere. The final activity is within 30% of the initial activity at a temperature between 150 and 650° C., preferably between 200 and 500° C.

A method of using a catalyst comprises exposing a catalyst to at least one reactant in a chemical process. As used herein, chemical process can include any suitable chemical process using a catalyst comprising a small pore molecular sieve comprising copper and encountering reducing conditions. Typical chemical processes include, but are not limited to, exhaust gas treatment such as selective catalytic reduction using nitrogenous reductants, lean $NO_x$ catalyst, catalyzed soot filter, or a combination of any one of these with a $NO_X$ adsorber catalyst or a three-way catalyst (TWC), e.g., NAC+(downstream)SCR or TWC+(downstream)SCR.

According to another aspect of the invention, provided is a system comprising NAC+(downstream)SCR or TWC+(downstream)SCR, wherein the SCR catalyst comprises a copper promoted small pore zeolite sieve as described here.

According to another aspect of the invention, provided is an SCR catalyzed soot filter wherein the SCR catalyst comprises a copper promoted small pore zeolite sieve as described here.

A method of using a catalyst comprises exposing a catalyst to at least one reactant. The reactant may include any reactants typically encountered in the chemical processes above. Reactants may include a selective catalytic reductant, such as ammonia. Selective catalytic reduction may include (1) using ammonia or a nitrogenous reductant or (2) a hydrocarbon reductant (the latter also known as lean $NO_X$ catalysis). Other reactants may include nitrogen oxides and oxygen.

The catalyst comprises a transition metal, preferably copper, and a small pore molecular sieve having a maximum ring size of eight tetrahedral atoms. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve framework may be defined as is generally acceptable by the International Zeolite Association framework type codes (at http://www.iza-online.org/). These molecular sieves are described in more detail below.

Molecular sieves are typically defined by the member rings as follows: large pore rings are 12-member rings or larger; medium pore rings are 10-member rings; and small pore rings are 8-member rings or smaller. The catalyst in the present invention is a small pore ring having a maximum ring size of eight tetrahedral atoms.

Most catalysts are supported on medium pore (10-ring, such as ZSM-5) or large pore (12-ring, such as Beta) molecular sieves. A molecular sieve supported copper SCR catalyst, for example, may exhibit wide temperature windows under NO only conditions. These catalysts, however, are not stable against repeated lean/rich high temperature aging as is demonstrated in FIG. 1. In FIG. 1, a Cu/Beta catalyst (large pore) and a Cu/ZSM-5 catalyst (medium pore) are shown under hydrothermal aging conditions and lean/rich aging conditions. As is evidenced by the dotted lines representing the lean/rich aging conditions, these types of catalysts are not suitable when exposed to repeated reducing conditions. In particular, these catalysts are not suitable for NAC+SCR applications.

Figure 2:
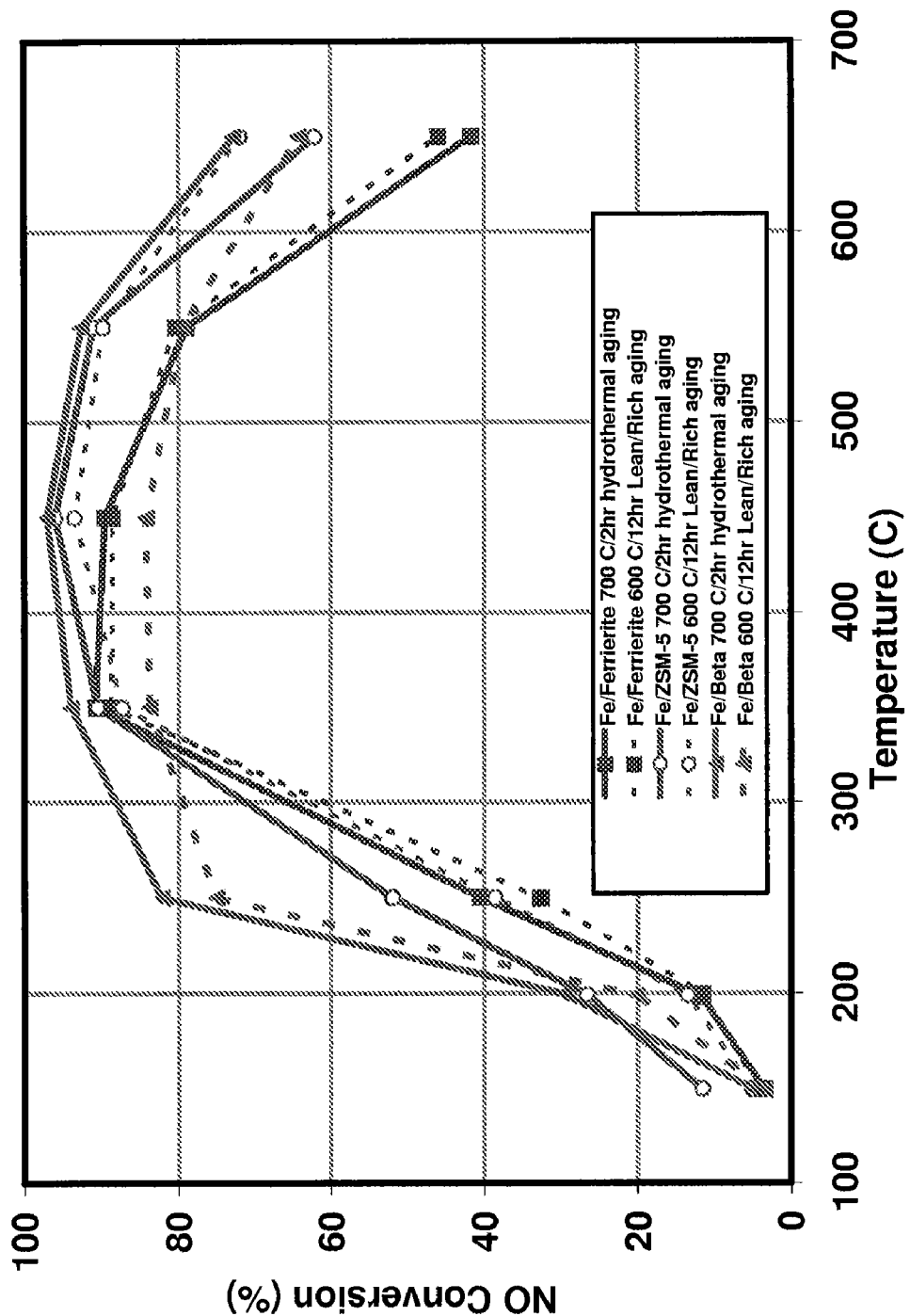
FIG. 2 is a graph illustrating $NO_X$ conversion of Fe/molecular sieve catalysts after lean hydrothermal aging and lean/rich cycle aging.

Molecular sieve supported iron SCR catalysts, although not as active as molecular sieve supported copper catalysts at low temperatures (e.g. <350° C.), are stable against repeated lean/rich high temperature aging as shown in FIG. 2. In FIG. 2, Fe/Ferrierite, Fe/ZSM-5, and Fe/Beta are shown after hydrothermal aging and lean/rich aging conditions. Accordingly, molecular sieve supported iron catalysts have been the technology of choice due to their excellent stability against cycled lean/rich aging, e.g., as is encountered in NAC+SCR applications.

Figure 3:
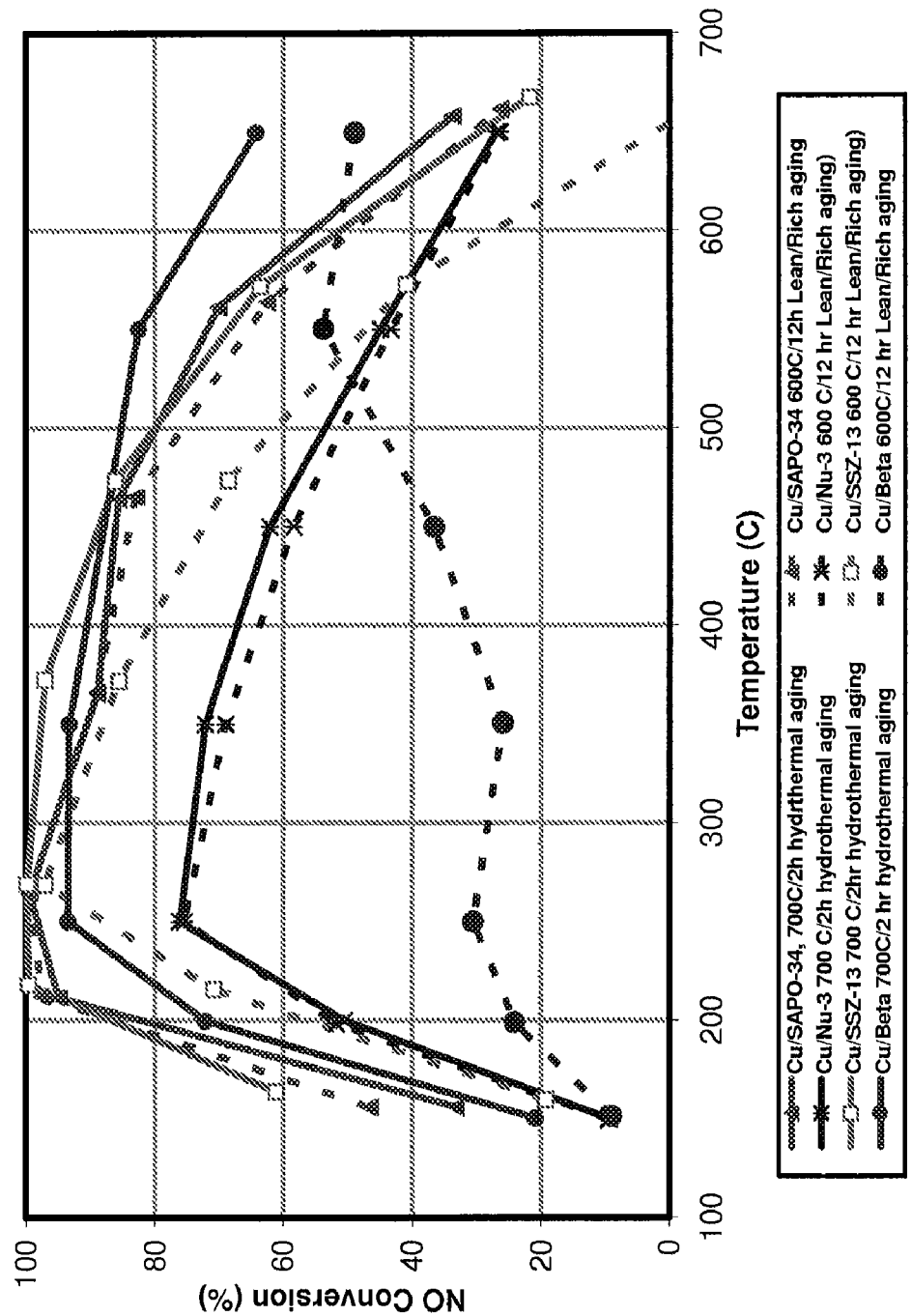
FIG. 3 is a graph illustrating $NO_X$ conversion of small pore molecular sieve supported copper catalysts according to embodiments of the invention and a comparative Cu/Beta catalyst after lean hydrothermal aging and lean/rich cycle aging.

Small pore molecular sieve supported Cu catalysts have been demonstrated to exhibit improved $NH_3$—SCR activity and excellent thermal stability. According to one aspect of the invention, it was found that this type of catalyst also tolerates repeated lean/rich high temperature aging. FIG. 3 compares a series of small pore molecular sieve supported Cu catalysts (Cu/SAPO-34, Cu/Nu-3, and Cu/SSZ-13, respectively) against a comparative large pore catalyst (Cu/Beta) after 700° C./2 hours hydrothermal aging and 600° C./12 hours cycled lean/rich aging, respectively. As is evident in FIG. 3, the catalysts with small pore molecular sieve are very stable against lean/rich aging. In particular, the Cu/SAPO-34 catalyst exhibited exceptionally good low temperature activity and showed no activity degradation after cycled lean/rich aging, i.e., repeated exposure to a reducing atmosphere.

The catalysts in embodiments of the present invention show a much wider temperature window of high $NO_X$ conversion. The temperature range of improved conversion efficiency may range from about 150 to 650° C., more particularly from 200 to 500° C., more particularly from 200 to 450° C., or most significantly from about 200 to 400° C. In these temperature ranges, conversion efficiencies after exposure to a reducing atmosphere, and even after exposure to a reducing atmosphere and to high temperatures (e.g., up to 850° C.), may range from greater than 55% to 100%, more preferably greater than 90% efficiency, and even more preferably greater than 95% efficiency. In particular, combined NAC+SCR systems show a much wider temperature window of high $NO_X$ conversion compared to either NAC catalysts alone or NAC+SCR systems using a Fe/molecular sieve SCR catalyst. See FIG. 4. For example at about 250° C. and about 300° C., the $NO_X$ conversion efficiencies for systems subjected to lean/rich aging are as follows:

| System (undergone lean/rich aging) | $NO_x$ Conversion % at 250° C. | $NO_x$ Conversion % at 300° C. |
|---|---|---|
| NAC alone | 73 | 92 |
| NAC + Fe/Beta SCR catalyst | 87 | 90 |
| NAC + Cu/SSZ-13 SCR catalyst | 93 | 97 |
| NAC + Cu/SAPO-34 SCR catalyst | 97 | 96 |

As is evident from these results, the use of the NAC+Cu/small pore molecular sieve catalyst shows dramatic improvement in conversion efficiencies. These improvements are to the final $NO_X$ emissions. Thus, an improvement from about 87% $NO_X$ conversion (about 13% $NO_X$ remaining) to about 97% $NO_X$ conversion (about 3% $NO_X$ remaining) is about a 433% improvement in efficiency, based on the percent $NO_X$ remaining.

The catalyst has an initial activity and the catalyst has a final activity after the at least one period of exposure to the reducing atmosphere. In certain embodiments, catalyst activity is NOx conversion efficiency. Accordingly, the initial activity is NOx conversion efficiency of a catalyst that has not been exposed to a reducing atmosphere and the final activity is NOx conversion efficiency of the catalyst after exposure to a reducing atmosphere. The initial activity may include a baseline aging under hydrothermal conditions. Hydrothermal conditions may include aging at 700° C. for 2 hours with 5% $H_2O$ in air.

The chemical process undergoes at least one period of exposure to a reducing atmosphere. The reducing atmosphere may include any suitable reducing atmosphere such as during rich conditions in a lean/rich aging cycle. For example, a localized reducing atmosphere may also occur during catalyzed soot filter regeneration. The at least one period of exposure may include repeated exposures to reducing conditions or a prolonged exposure to reducing conditions. For example, a repeated exposure may include a cycled lean/rich aging at 600° C. for 12 hours. A lean cycle may last from 15 seconds to several tens of minutes, and a rich cycle may last from less than 1 second to several minutes. In a NAC-SCR system or TWC-SCR system, the rich cycle may range, for example, from 1 to 60 continuous seconds, from 1 to 15 continuous seconds, or from 5 to 15 continuous seconds. In a coated soot filter application (e.g., a SCR/DPF (diesel particulate filter), the rich cycle may range, for example, from 30 seconds to 60 minutes of continuous exposure, from 5 minutes to 30 minutes of continuous exposure, or from 10 minutes to 30 minutes of continuous exposure. For example, the lean portion of the cycle may consist of exposure to 200 ppm NO, 10% $O_2$, 5% $H_2O$, 5% $CO_2$ in $N_2$, and the rich portion of the cycle may consist of exposure to 200 ppm NO, 5000 ppm $C_3H_6$, 1.3% $H_2$, 4% CO, 1% $O_2$, 5% $H_2O$, 5% $CO_2$ in $N_2$. The reducing atmosphere may be a high temperature reducing atmosphere. A high temperature reducing atmosphere may occur at a temperature from about 150° C. to 850° C. or more particularly from about 450° C. to 850° C.

The final activity is within about 30%, more preferably within about 10%, more preferably within about 5%, even more preferably within about 3% of the initial activity at a catalytic operating temperature. Preferably, the catalytic operating temperature is between about 150 and about 650° C. and more preferably between about 200 and about 500° C. While the activity of the catalyst is preferably measured within a temperature range of 200 and 500° C., portions of the chemical process can operate at any temperature, for example, a wider temperature range including higher temperatures. For example, catalyst activity will still be maintained in the temperature range of 200 and 500° C. even after the catalyst has been exposed to higher temperatures, e.g. up to 850° C. As used herein, when the final activity is given as a percentage of the initial activity, it is given as an average of percentages over the temperature range provided; in other words, if a final activity is said to be within 30% of the initial activity at a temperature between 200 and 500° C., it need not be less than 30% at every temperatures tested in that range, but would merely average less than 30% over the temperatures tested. Moreover, while activity is identified as $NO_X$ conversion in the examples of this application, the activity could be some other measure of catalyst activity depending on the chemical process, as is known in the art. The data showing catalyst activity and the percentage of initial activity to final activity is evidenced in the following tables (See also FIG. 3). A negative number means that the activity after exposure to the reducing conditions actually improved relative to the initial activity (and therefore would certainly be "within" a certain positive percentage of the initial activity):

For the embodiment using Cu/Nu-3 the following data was obtained:

| TEMP | HT Aging | TEMP | LR Aging | % |
|---|---|---|---|---|
| 150 | 9 | 150 | 9 | −2% |
| 200 | 50 | 198 | 52 | −2% |
| 250 | 76 | 250 | 75 | 1% |
| 350 | 72 | 350 | 69 | 4% |
| 450 | 62 | 450 | 58 | 6% |
| 550 | 45 | 550 | 43 | 3% |
| 650 | 27 | 650 | 26 | 2% |

Thus, the lean/rich aging % $NO_X$ reduction was within about 6% of the hydrothermal aging % $NO_X$ reduction. Accordingly, the catalyst remained stable and had good activity following repeated exposure to reducing conditions throughout the temperature ranging from about 150 to about 650° C.

For the embodiment using Cu/SSZ-13 the following data was obtained:

| TEMP | HT Aging | TEMP | LR Aging | % |
|---|---|---|---|---|
| 164 | 61 | 160 | 19 | 68% |
| 218 | 100 | 216 | 71 | 29% |
| 269 | 100 | 269 | 97 | 3% |
| 373 | 97 | 372 | 86 | 12% |
| 473 | 86 | 474 | 68 | 20% |
| 572 | 64 | 573 | 41 | 36% |
| 668 | 22 | 669 | −7 | 134% |

Thus, the lean/rich aging % $NO_X$ reduction was within about 30% of the hydrothermal aging % $NO_X$ reduction throughout the temperature ranging from about 200 to about 500° C.

For the embodiment using Cu/SAPO34 the following data was obtained:

| TEMP | HT Aging | TEMP | LR Aging | % |
|---|---|---|---|---|
| 156 | 33 | 156 | 47 | −41% |
| 211 | 95 | 212 | 97 | −3% |
| 264 | 99 | 265 | 99 | 0.04% |
| 366 | 89 | 366 | 89 | −0.01% |
| 464 | 86 | 465 | 83 | 3% |
| 561 | 70 | 564 | 62 | 11% |
| 658 | 34 | 662 | 26 | 22% |

Thus, the lean/rich aging % $NO_X$ reduction was within about 3% of the hydrothermal aging % $NO_X$ reduction throughout the temperature ranging from about 200 to about 500° C., and within about 10% at temperatures ranging from about 200 to 560° C.

As a comparative example a Cu/Beta, large pore molecular sieve catalyst, was compared:

| TEMP | HT Aging | TEMP | LR Aging | % |
|---|---|---|---|---|
| 150 | 21 | 152 | 9 | 57% |
| 200 | 72 | 199 | 24 | 67% |
| 250 | 93 | 250 | 30 | 67% |
| 350 | 93 | 351 | 26 | 72% |
| 450 | 82 | 450 | 37 | 56% |
| 550 | 82 | 550 | 54 | 35% |
| 650 | 64 | 650 | 49 | 24% |

The Cu/Beta comparative example showed poor activity following lean/rich cycled aging. Thus, exposure to a reducing atmosphere for the copper molecular sieve catalysts causes poor stability and activity as was contemplated prior to discovery of the present invention.

According to one embodiment of the present invention, a method of using a catalyst comprises exposing a catalyst to at least one reactant comprising nitrogen oxides in a chemical process comprising exhaust gas treatment. The catalyst comprises copper and a small pore molecular sieve having a maximum ring size of eight tetrahedral atoms selected from the group of Framework Type Codes consisting of CHA, LEV, ERI and DDR. The chemical process undergoes at least one period of exposure to a reducing atmosphere. The catalyst has an initial activity, and the catalyst has a final activity after the at least one period of exposure to the reducing atmosphere. The final activity is within 10% of the initial activity at a temperature between 250 and 350° C. In a preferred embodiment, the catalyst has a final activity that is within 3% of the initial activity at a temperature between 250 and 350° C.

Figure 4:
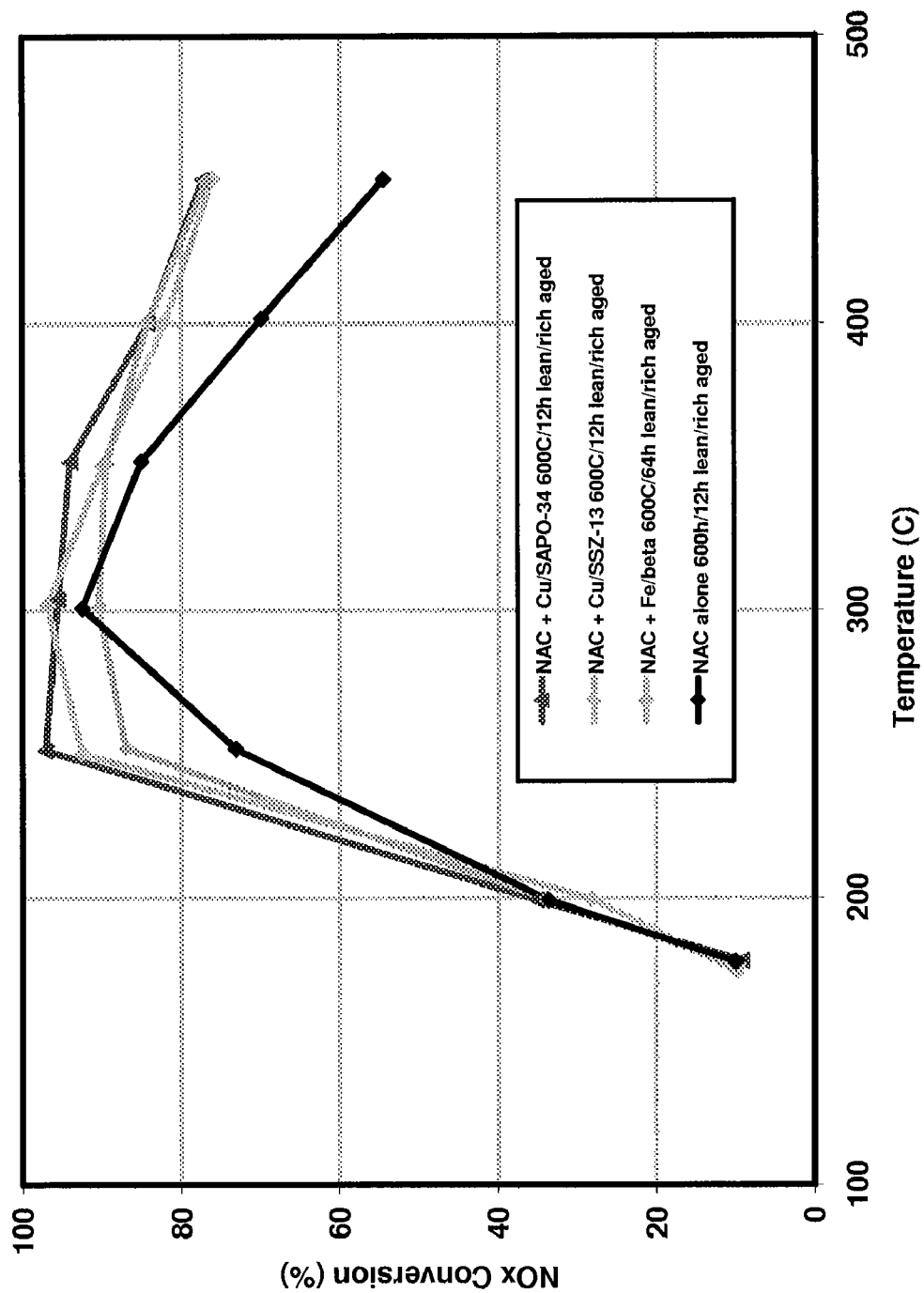
FIG. 4 is a graph illustrating $NO_X$ conversion efficiency over a NAC and combined NAC+SCR systems with different SCR catalysts according to embodiments of the invention and comparative examples.

In an embodiment of the invention, the catalysts have been combined with a NAC($NO_X$ adsorber catalyst) and tested as NAC+SCR systems. FIG. 4 compares the $NO_X$ reduction efficiency over a NAC alone and NAC+SCR systems with different SCR small pore molecular sieve catalysts (Cu/SAPO-34, and Cu/SSZ-13), and a comparative example of a Fe/beta catalyst. Combining an Fe/molecular sieve SCR with a NAC catalyst has been shown to improve the system $NO_X$ conversion compared to NAC alone. Remarkably, however, the other two systems with a small pore molecular sieve comprising copper, i.e., Cu/SAPO-34 or Cu/SSZ-13, also exhibited further improved $NO_X$ removal efficiency. This is especially evident at low temperatures (200-350° C.). These results clearly suggest that small pore molecular sieve supported Cu catalysts offers new potential to further improve the performance of NAC+SCR systems.

In addition to NAC+SCR applications, the small pore molecular sieve supported Cu catalysts offer significant performance advantages for other applications that may be exposed to a high temperature reducing atmosphere. For example, a small pore molecular sieve supported Cu catalyst may be used in a reducing atmosphere which occurs during active regeneration of a SCR/DPF (diesel particulate filter). Small pore molecular sieve supported Cu catalysts provide excellent thermal durability and exceptional stability against reducing conditions, e.g., rich aging that occurs in exhaust gas treatment systems.

It will be appreciated that by defining the molecular sieve by their Framework Type Codes we intend to include the "Type Material" and any and all isotypic framework materials. (The "Type Material" is the species first used to establish the framework type). Reference is made to Table 1, which lists a range of illustrative molecular sieve materials for use in the present invention. For the avoidance of doubt, unless otherwise made clear, reference herein to a molecular sieve by name, e.g. "chabazite", is to the molecular sieve material per se (in this example the naturally occurring type material chabazite) and not to any other material designated by the Framework Type Code to which the individual molecular sieve may belong, e.g. some other isotypic framework material. Use of a FTC herein is intended to refer to the Type Material and all isotypic framework materials defined by that FTC.

The distinction between molecular sieve type materials, such as naturally occurring (i.e. mineral) chabazite, and isotypes within the same Framework Type Code is not merely arbitrary, but reflects differences in the properties between the materials, which may in turn lead to differences in activity in the method of the present invention. It will be appreciated, e.g. from Table 1 hereinbelow, that by "MeAPSO" and "MeAlPO" we intend zeotypes substituted with one or more metals. Suitable substituent metals include one or more of, without limitation, As, B, Be, Co, Fe, Ga, Ge, Li, Mg, Mn, Zn and Zr.

In a particular embodiment, the small pore molecular sieve catalysts for use in the present invention can be selected from the group consisting of aluminosilicate molecular sieves, metal-substituted aluminosilicate molecular sieves and aluminophosphate molecular sieves. Aluminophosphate molecular sieves with application in the present invention include aluminophosphate (AlPO) molecular sieves, metal substituted (MeAlPO) molecular sieves, silico-aluminophosphate (SAPO) molecular sieves and metal substituted silico-aluminophosphate (MeAPSO) molecular sieves.

In one embodiment, the small pore molecular sieve is selected from the group of Framework Type Codes consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON.

In an embodiment, the small pore molecular sieve containing a maximum ring size of eight tetrahedral atoms is selected from the group of Framework Type Codes consisting of CHA, LEV, ERI, and DDR. In a preferred embodiment, the small pore molecular sieve comprises a CHA Framework Type Code selected from SAPO-34 or SSZ-13. In another embodiment, the small pore molecular sieve comprises a LEV Framework Type Code Nu-3. Additionally, the small pore molecular sieve may comprise an AEI Framework Type Code SAPO-18, an ERI Framework Type Code ZSM-34, and/or a DDR Framework Type Code sigma-1. The small pore molecular sieve may also include disordered molecular sieves, such as an intergrown or mixed phase AEI/CHA, AEI/SAV, etc.

Molecular sieves with application in the present invention can include those that have been treated to improve hydrothermal stability. Illustrative methods of improving hydrothermal stability include:

(i) Dealumination by: steaming and acid extraction using an acid or complexing agent e.g. (EDTA—ethylenediaminetetracetic acid); treatment with acid and/or complexing agent; treatment with a gaseous stream of $SiCl_4$ (replaces Al in the molecular sieve framework with Si);

(ii) Cation exchange—use of multi-valent cations such as La; and (iii) Use of phosphorous containing compounds (see e.g. U.S. Pat. No. 5,958,818).

Illustrative examples of suitable small pore molecular sieves are set out in Table 1.

TABLE 1

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
| ACO | *ACP-1 | 3D | 3.5 × 2.8, 3.5 × 3.5 | Ring sizes - 8, 4 |
| AEI | *AlPO-18 [Co—Al—P—O]-AEI SAPO-18 SIZ-8 SSZ-39 | 3D | 3.8 × 3.8 | Ring sizes - 8, 6, 4 |
| AEN | *AlPO-EN3 AlPO-53(A) AlPO-53(B) [Ga—P—O]-AEN CFSAPO-1A CoIST-2 IST-2 JDF-2 MCS-1 MnAPO-14 Mu-10 UiO-12-500 UiO-12-as | 2D | 4.3 × 3.1, 2.7 × 5.0 | Ring sizes - 8, 6, 4 |
| AFN | *AlPO-14 \|($C_3N_2H_{12}$)—\| [Mn—Al—P—O]-AFN GaPO-14 | 3D | 1.9 × 4.6, 2.1 × 4.9, 3.3 × 4.0 | Ring sizes - 8, 6, 4 |
| AFT | *AlPO-52 | 3D | 3.8 × 3.2, 3.8 × 3.6 | Ring sizes - 8, 6, 4 |
| AFX | *SAPO-56 MAPSO-56, M=Co, Mn, Zr SSZ-16 | 3D | 3.4 × 3.6 | Ring sizes - 8, 6, 4 |

TABLE 1-continued

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
| ANA | *Analcime | 3D | 4.2 × 1.6 | Ring sizes - 8, 6, 4 |
|  | AlPO$_4$-pollucite |  |  |  |
|  | AlPO-24 |  |  |  |
|  | Ammonioleucite |  |  |  |
|  | [Al—Co—P—O]-ANA |  |  |  |
|  | [Al—Si—P—O]-ANA |  |  |  |
|  | |Cs—|[Al—Ge—O]-ANA |  |  |  |
|  | |Cs—|[Be—Si—O]-ANA |  |  |  |
|  | |Cs$_{16}$|[Cu$_8$Si$_{40}$O$_{96}$]-ANA |  |  |  |
|  | |Cs—Fe|[Si—O]-ANA |  |  |  |
|  | |Cs—Na—(H$_2$O)| |  |  |  |
|  | [Ga—Si—O]-ANA |  |  |  |
|  | [Ga—Ge—O]-ANA |  |  |  |
|  | |K—|[B—Si—O]-ANA |  |  |  |
|  | |K—| |  |  |  |
|  | [Be—B—P—O]-ANA |  |  |  |
|  | |Li—| |  |  |  |
|  | [Li—Zn—Si—O]-ANA |  |  |  |
|  | |Li—Na| |  |  |  |
|  | [Al—Si—O]-ANA |  |  |  |
|  | |Na—| |  |  |  |
|  | [Be—B—P—O]-ANA |  |  |  |
|  | |(NH$_4$)—| |  |  |  |
|  | [Be—B—P—O]-ANA |  |  |  |
|  | |(NH$_4$)—| |  |  |  |
|  | [Zn—Ga—P—O]-ANA |  |  |  |
|  | [Zn—As—O]-ANA |  |  |  |
|  | Ca-D |  |  |  |
|  | Hsianghualite |  |  |  |
|  | Leucite |  |  |  |
|  | Na—B |  |  |  |
|  | Pollucite |  |  |  |
|  | Wairakite |  |  |  |
| APC | *AlPO-C | 2D | 3.7 × 3.4, 4.7 × 2.0 | Ring sizes - 8, 6, 4 |
|  | AlPO-H3 |  |  |  |
|  | CoAPO-H3 |  |  |  |
| APD | *AlPO-D | 2D | 6.0 × 2.3, 5.8 × 1.3 | Ring sizes - 8, 6, 4 |
|  | APO-CJ3 |  |  |  |
| ATT | *AlPO-12-TAMU | 2D | 4.6 × 4.2, 3.8 × 3.8 | Ring sizes - 8, 6, 4 |
|  | AlPO-33 |  |  |  |
|  | RMA-3 |  |  |  |
| CDO | *CDS-1 | 2D | 4.7 × 3.1, 4.2 × 2.5 | Ring sizes - 8, 5 |
|  | MCM-65 |  |  |  |
|  | UZM-25 |  |  |  |
| CHA | *Chabazite | 3D | 3.8 × 3.8 | Ring sizes - 8, 6, 4 |
|  | AlPO-34 |  |  |  |
|  | [Al—As—O]-CHA |  |  |  |
|  | [Al—Co—P—O]-CHA |  |  |  |
|  | |Co| [Be—P—O]-CHA |  |  |  |
|  | |Co$_3$ (C$_6$N$_4$H$_{24}$)$_3$ (H$_2$O)$_9$| [Be$_{18}$P$_{18}$O$_{72}$]-CHA |  |  |  |
|  | [Co—Al—P—O]-CHA |  |  |  |
|  | |Li—Na| |  |  |  |
|  | [Al—Si—O]-CHA |  |  |  |
|  | [Mg—Al—P—O]-CHA |  |  |  |
|  | [Si—O]-CHA |  |  |  |
|  | [Zn—Al—P—O]-CHA |  |  |  |
|  | [Zn—As—O]-CHA |  |  |  |
|  | CoAPO-44 |  |  |  |
|  | CoAPO-47 |  |  |  |
|  | DAF-5 |  |  |  |
|  | GaPO-34 |  |  |  |
|  | K-Chabazite |  |  |  |
|  | Linde D |  |  |  |
|  | Linde R |  |  |  |
|  | LZ-218 |  |  |  |
|  | MeAPO-47 |  |  |  |
|  | MeAPSO-47 |  |  |  |
|  | (Ni(deta)$_2$)-UT-6 |  |  |  |
|  | Phi |  |  |  |
|  | SAPO-34 |  |  |  |
|  | SAPO-47 |  |  |  |
|  | SSZ-13 |  |  |  |
|  | UiO-21 |  |  |  |
|  | Willhendersonite |  |  |  |
|  | ZK-14 |  |  |  |
|  | ZYT-6 |  |  |  |
| DDR | *Deca-dodecasil 3R | 2D | 4.4 × 3.6 | Ring sizes - 8, 6, 5, 4 |
|  | [B—Si—O]-DDR |  |  |  |
|  | Sigma-1 |  |  |  |
|  | ZSM-58 |  |  |  |
| DFT | *DAF-2 | 3D | 4.1 × 4.1, 4.7 × 1.8 | Ring sizes - 8, 6, 4 |
|  | ACP-3, |  |  |  |
|  | [Co—Al—P—O]-DFT |  |  |  |
|  | [Fe—Zn—P—O]-DFT |  |  |  |
|  | [Zn—Co—P—O]-DFT |  |  |  |
|  | UCSB-3GaGe |  |  |  |
|  | UCSB-3ZnAs |  |  |  |
|  | UiO-20, |  |  |  |
|  | [Mg—P—O]-DFT |  |  |  |
| EAB | *TMA-E | 2D | 5.1 × 3.7 | Ring sizes - 8, 6, 4 |
|  | Bellbergite |  |  |  |
| EDI | *Edingtonite | 3D | 2.8 × 3.8, 3.1 × 2.0 | Ring sizes - 8, 4 |
|  | |(C$_3$H$_{12}$N$_2$)$_{2.5}$| [Zn$_5$P$_5$O$_{20}$]-EDI |  |  |  |
|  | [Co—Al—P—O]-EDI |  |  |  |
|  | [Co—Ga—P—O]-EDI |  |  |  |
|  | |Li—|[Al—Si—O]-EDI |  |  |  |
|  | |Rb$_7$ Na (H$_2$O)$_3$| |  |  |  |
|  | [Ga$_8$Si$_{12}$O$_{40}$]-EDI |  |  |  |
|  | [Zn—As—O]-EDI |  |  |  |
|  | K—F |  |  |  |
|  | Linde F |  |  |  |
|  | Zeolite N |  |  |  |
| EPI | *Epistilbite | 2D | 4.5 × 3.7, 3.6 × 3.6 | Ring sizes - 8, 4 |
| ERI | *Erionite | 3D | 3.6 × 5.1 | Ring sizes - 8, 6, 4 |
|  | AlPO-17 |  |  |  |
|  | Linde T |  |  |  |
|  | LZ-220 |  |  |  |
|  | SAPO-17 |  |  |  |
|  | ZSM-34 |  |  |  |
| GIS | *Gismondine | 3D | 4.5 × 3.1, 4.8 × 2.8 | Ring sizes - 8, 4 |
|  | Amicite |  |  |  |
|  | [Al—Co—P—O]-GIS |  |  |  |

TABLE 1-continued

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
|  | [Al—Ge—O]-GIS |  |  |  |
|  | [Al—P—O]-GIS |  |  |  |
|  | [Be—P—O]-GIS |  |  |  |
|  | |(C$_3$H$_{12}$N$_2$)$_4$|[Be$_8$P$_8$O$_{32}$]-GIS |  |  |  |
|  | |(C$_3$H$_{12}$N$_2$)$_4$|[Zn$_8$P$_8$O$_{32}$]-GIS |  |  |  |
|  | [Co—Al—P—O]-GIS |  |  |  |
|  | [Co—Ga—P—O]-GIS |  |  |  |
|  | [Co—P—O]-GIS |  |  |  |
|  | |Cs$_4$|[Zn$_4$B$_4$P$_8$O$_{32}$]-GIS |  |  |  |
|  | [Ga—Si—O]-GIS |  |  |  |
|  | [Mg—Al—P—O]-GIS |  |  |  |
|  | |(NH$_4$)$_4$|[Zn$_4$B$_4$P$_8$O$_{32}$]-GIS |  |  |  |
|  | |Rb$_4$|[Zn$_4$B$_4$P$_8$O$_{32}$]-GIS |  |  |  |
|  | [Zn—Al—As—O]-GIS |  |  |  |
|  | [Zn—Co—B—P—O]-GIS |  |  |  |
|  | [Zn—Ga—As—O]-GIS |  |  |  |
|  | [Zn—Ga—P—O]-GIS |  |  |  |
|  | Garronite |  |  |  |
|  | Gobbinsite |  |  |  |
|  | MAPO-43 |  |  |  |
|  | MAPSO-43 |  |  |  |
|  | Na-P1 |  |  |  |
|  | Na-P2 |  |  |  |
|  | SAPO-43 |  |  |  |
|  | TMA-gismondine |  |  |  |
| GOO | *Goosecreekite | 3D | 2.8 × 4.0, 2.7 × 4.1, 4.7 × 2.9 | Ring sizes - 8, 6, 4 |
| IHW | *ITQ-32 | 2D | 3.5 × 4.3 | Ring sizes - 8, 6, 5, 4 |
| ITE | *ITQ-3 | 2D | 4.3 × 3.8, 2.7 × 5.8 | Ring sizes - 8, 6, 5, 4 |
|  | Mu-14 |  |  |  |
|  | SSZ-36 |  |  |  |
| ITW | *ITQ-12 | 2D | 5.4 × 2.4, 3.9 × 4.2 | Ring sizes - 8, 6, 5, 4 |
| LEV | *Levyne | 2D | 3.6 × 4.8 | Ring sizes - 8, 6, 4 |
|  | AlPO-35 |  |  |  |
|  | CoDAF-4 |  |  |  |
|  | LZ-132 |  |  |  |
|  | NU-3 |  |  |  |
|  | RUB-1 [B—Si—O]-LEV |  |  |  |
|  | SAPO-35 |  |  |  |
|  | ZK-20 |  |  |  |
|  | ZnAPO-35 |  |  |  |
| KFI | ZK-5 | 3D | 3.9 × 3.9 | Ring sizes - 8, 6, 4 |
|  | |18-crown-6| [Al—Si—O]-KFI |  |  |  |
|  | [Zn—Ga—As—O]-KFI |  |  |  |
|  | (Cs,K)-ZK-5 |  |  |  |
|  | P |  |  |  |
|  | Q |  |  |  |
| MER | *Merlinoite | 3D | 3.5 × 3.1, 3.6 × 2.7, 5.1 × 3.4, 3.3 × 3.3 | Ring sizes - 8, 4 |
|  | [Al—Co—P—O]-MER |  |  |  |
|  | |Ba—|[Al—Si—O]-MER |  |  |  |
|  | |Ba—Cl—|[Al—Si—O]-MER |  |  |  |
|  | [Ga—Al—Si—O]-MER |  |  |  |
|  | [K—|[Al—Si—O]-MER |  |  |  |
|  | |NH$_4$—|[Be—P—O]-MER |  |  |  |
|  | K-M |  |  |  |
|  | Linde W |  |  |  |
|  | Zeolite W |  |  |  |
| MON | *Montesommaite | 2D | 4.4 × 3.2, 3.6 × 3.6 | Ring sizes - 8, 5, 4 |
|  | [Al—Ge—O]-MON |  |  |  |
| NSI | *Nu-6(2) | 2D | 2.6 × 4.5, 2.4 × 4.8 | Ring sizes - 8, 6, 5 |
|  | EU-20 |  |  |  |
| OWE | *UiO-28 | 2D | 4.0 × 3.5, 4.8 × 3.2 | Ring sizes - 8, 6, 4 |
|  | ACP-2 |  |  |  |
| PAU | *Paulingite | 3D | 3.6 × 3.6 | Ring sizes - 8, 6, 4 |
|  | [Ga—Si—O]-PAU |  |  |  |
|  | ECR-18 |  |  |  |
| PHI | *Phillipsite | 3D | 3.8 × 3.8, 3.0 × 4.3, 3.3 × 3.2 | Ring sizes - 8, 4 |
|  | [Al—Co—P—O]-PHI |  |  |  |
|  | DAF-8 |  |  |  |
|  | Harmotome |  |  |  |
|  | Wellsite |  |  |  |
|  | ZK-19 |  |  |  |
| RHO | *Rho | 3D | 3.6 × 3.6 | Ring sizes - 8, 6, 4 |
|  | [Be—As—O]-RHO |  |  |  |
|  | [Be—P—O]-RHO |  |  |  |
|  | [Co—Al—P—O]-RHO |  |  |  |
|  | |H—|[Al—Si—O]-RHO |  |  |  |
|  | [Mg—Al—P—O]-RHO |  |  |  |
|  | [Mn—Al—P—O]-RHO |  |  |  |
|  | |Na$_{16}$Cs$_8$|[Al$_{24}$Ge$_{24}$O$_{96}$]-RHO |  |  |  |
|  | |NH$_4$—|[Al—Si—O]-RHO |  |  |  |
|  | |Rb—|[Be—As—O]-RHO |  |  |  |
|  | Gallosilicate ECR-10 |  |  |  |
|  | LZ-214 |  |  |  |
|  | Pahasapaite |  |  |  |
| RTH | *RUB-13 | 2D | 4.1 × 3.8, 5.6 × 2.5 | Ring sizes - 8, 6, 5, 4 |
|  | SSZ-36 |  |  |  |
|  | SSZ-50 |  |  |  |
| SAT | *STA-2 | 3D | 5.5 × 3.0 | Ring sizes - 8, 6, 4 |
| SAV | *Mg-STA-7 | 3D | 3.8 × 3.8, 3.9 × 3.9 | Ring sizes - 8, 6, 4 |
|  | Co-STA-7 |  |  |  |
|  | Zn-STA-7 |  |  |  |
| SBN | *UCSB-9 | 3D | TBC | Ring sizes - 8, 4, 3 |
|  | SU-46 |  |  |  |

TABLE 1-continued

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
| SIV | *SIZ-7 | 3D | 3.5 × 3.9, 3.7 × 3.8, 3.8 × 3.9 | Ring sizes - 8, 4 |
| THO | *Thomsonite | 3D | 2.3 × 3.9, 4.0 × 2.2, 3.0 × 2.2 | Ring sizes - 8, 4 |
|  | [Al—Co—P—O]-THO [Ga—Co—P—O]-THO \|Rb$_{20}$\| [Ga$_{20}$Ge$_{20}$O$_{80}$]-THO [Zn—Al—As—O]-THO [Zn—P—O]-THO [Ga—Si—O]-THO) [Zn—Co—P—O]-THO |  |  |  |
| TSC | *Tschörtnerite | 3D | 4.2 × 4.2, 5.6 × 3.1 | Ring sizes - 8, 6, 4 |
| UEI | *Mu-18 | 2D | 3.5 × 4.6, 3.6 × 2.5 | Ring sizes - 8, 6, 4 |
| UFI | *UZM-5 | 2D | 3.6 × 4.4, 3.2 × 3.2 (cage) | Ring sizes - 8, 6, 4 |
| VNI | *VPI-9 | 3D | 3.5 × 3.6, 3.1 × 4.0 | Ring sizes - 8, 5, 4, 3 |
| YUG | *Yugawaralite | 2D | 2.8 × 3.6, 3.1 × 5.0 | Ring sizes - 8, 5, 4 |
|  | Sr-Q |  |  |  |
| ZON | *ZAPO-M1 | 2D | 2.5 × 5.1, 3.7 × 4.4 | Ring sizes - 8, 6, 4 |
|  | GaPO-DAB-2 UiO-7 |  |  |  |

Small pore molecular sieves with particular application for exposure to reducing conditions are set out in Table 2.

TABLE 2

Preferred Small Pore Molecular Sieves.

| Structure | Molecular Sieve |
|---|---|
| CHA | SAPO-34 |
|  | AlPO-34 |
|  | SSZ-13 |
| LEV | Levynite |
|  | Nu-3 |
|  | LZ-132 |
|  | SAPO-35 |
|  | ZK-20 |
| ERI | Erionite |
|  | ZSM-34 |
|  | Linde type T |
| DDR | Deca-dodecasil 3R |
|  | Sigma-1 |
| KFI | ZK-5 |
|  | 18-crown-6 |
|  | [Zn—Ga—As—O]-KFI |
| EAB | TMA-E |
| PAU | ECR-18 |
| MER | Merlinoite |
| AEI | SSZ-39 |
| GOO | Goosecreekite |
| YUG | Yugawaralite |
| GIS | P1 |

TABLE 2-continued

Preferred Small Pore Molecular Sieves.

| Structure | Molecular Sieve |
|---|---|
| VNI | VPI-9 |
| AEI | SAPO-18 |

Molecular sieves for use in the present application include natural and synthetic molecular sieves, preferably synthetic molecular sieves because the molecular sieves can have a more uniform: silica-to-alumina ratio (SAR), crystallite size, crystallite morphology, and the absence of impurities (e.g. alkaline earth metals). Small pore aluminosilicate molecular sieves may have a silica-to-alumina ratio (SAR) of from 2 to 300, optionally 4 to 200, and preferably 8 to 150. It will be appreciated that higher SAR ratios are preferred to improve thermal stability but this may negatively affect transition metal exchange.

The at least one reactant may contact the catalyst at a gas hourly space velocity of from 5,000 hr$^{-1}$ to 500,000 hr$^{-1}$, optionally from 10,000 hr$^{-1}$ to 200,000 hr$^{-1}$.

Small pore molecular sieves for use in the invention may have three-dimensional dimensionality, i.e. a pore structure which is interconnected in all three crystallographic dimensions, or two-dimensional dimensionality. In one embodiment, the small pore molecular sieves for use in the present invention consist of molecular sieves having three-dimensional dimensionality. In another embodiment, the small pore molecular sieves for use in the present invention consist of molecular sieves having two-dimensional dimensionality.

In certain embodiments, the small pore molecular sieve comprises, consists essentially of, or consists of a disordered framework selected from the group consisting of ABC-6, AEI/CHA, AEI/SAV, AEN/UEI, AFS/BPH, BEC/ISV, beta, fuajasite, ITE/RTH, KFI/SAV, lovdarite, montesommaite, MTT/TON, pentasils, SBS/SBT, SSF/STF, SSZ-33, and ZSM-48. In a preferred embodiment, one or more of the small pore molecular sieves may comprise a CHA Framework Type Code selected from SAPO-34, AlPO-34, SAPO-47, ZYT-6, CAL-1, SAPO-40, SSZ-62 or SSZ-13 and/or an AEI Framework Type Code of selected from AlPO-18, SAPO-18, SIZ-8, or SSZ-39. In one embodiment, the mixed phase composition is an AEI/CHA-mixed phase composition. The ratio of each framework type in the molecular sieve is not particularly limited. For example, the ratio of AEI/CHA may range from about 5/95 to about 95/5, preferably about 60/40 to 40/60. In an exemplary embodiment, the ratio of AEI/CHA may range from about 5/95 to about 40/60. It is envisioned that a disordered molecular sieve, such as AEI/CHA, will be used as the support for one or more transition metals, such as Cr, Mn, Fe, Co, Ce, Ni, Cu, Zn, Ga, Mo, Ru, Rh, Pd, Ag, In, Sn, Re, Ir, Pt, and mixtures thereof, preferably Cr, Mn, Fe, Co, Ce, Ni, Cu, Rh, Pd, Pt, and mixtures thereof, more preferably Fe and/or Cu, and most preferably copper.

The total of the copper metal that can be included in the molecular sieve can be from 0.01 to 20 wt %, based on the total weight of the catalyst. In one embodiment, the total of the copper that can be included can be from 0.1 to 10 wt %. In a particular embodiment, the total of copper that can be included is from 0.5 to 5 wt %. The copper may be included in the molecular sieve by any feasible method. For example, it can be added after the molecular sieve has been synthesized, e.g. by incipient wetness or exchange process; or can be added during molecular sieve synthesis.

A preferred two dimensional small pore molecular sieve for use in the present invention consists of Cu/LEV, such as Cu/Nu-3, whereas a preferred copper-containing three dimensional small pore molecular sieve/aluminophosphate molecular sieve for use in the present invention consists of Cu/CHA, such as Cu/SAPO-34 or Cu/SSZ-13.

The molecular sieve catalysts for use in the present invention can be coated on a suitable substrate monolith or can be formed as extruded-type catalysts, but are preferably used in a catalyst coating. In one embodiment, the molecular sieve catalyst is coated on a flow-through monolith substrate (i.e. a honeycomb monolithic catalyst support structure with many small, parallel channels running axially through the entire part) or filter monolith substrate such as a wall-flow filter etc. The molecular sieve catalyst for use in the present invention can be coated, e.g. as a washcoat component, on a suitable monolith substrate, such as a metal or ceramic flow through monolith substrate or a filtering substrate, such as a wall-flow filter or sintered metal or partial filter (such as is disclosed in WO 01/80978 or EP 1057519, the latter document describing a substrate comprising convoluted flow paths that at least slows the passage of soot therethrough). Alternatively, the molecular sieves for use in the present invention can be synthesized directly onto the substrate. Alternatively, the molecular sieve catalysts according to the invention can be formed into an extruded-type flow through catalyst.

Washcoat compositions containing the molecular sieves for use in the present invention for coating onto the monolith substrate for manufacturing extruded type substrate monoliths can comprise a binder selected from the group consisting of alumina, silica, (non molecular sieve) silica-alumina, naturally occurring clays, $TiO_2$, $ZrO_2$, and $SnO_2$.

In one embodiment, the at least one reactant, e.g., nitrogen oxides, are reduced with the reducing agent at a temperature of at least 100° C. In another embodiment, the at least one reactant are reduced with the reducing agent at a temperature from about 150° C. to 750° C. In a particular embodiment, the temperature range is from 175 to 550° C., or more particularly from 175 to 400° C.

For a reactant including nitrogen oxides, the reduction of nitrogen oxides may be carried out in the presence of oxygen or in the absence of oxygen. The source of nitrogenous reductant can be ammonia per se, hydrazine or any suitable ammonia precursor (such as urea $((NH_2)_2CO)$), ammonium carbonate, ammonium carbamate, ammonium hydrogen carbonate or ammonium formate.

The method may be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, coffee roasting plants, etc.

In a particular embodiment, the method is used for treating exhaust gas from a vehicular internal combustion engine with a lean/rich cycle, such as a diesel engine, a gasoline engine, or an engine powered by liquid petroleum gas or natural gas.

For a reactant including nitrogen oxides, the nitrogenous reductant may be metered into the flowing exhaust gas only when it is determined that the molecular sieves catalyst is capable of catalyzing $NO_X$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

Metering may be controlled in response to the quantity of nitrogen oxides in the exhaust gas determined either directly (using a suitable $NO_X$ sensor) or indirectly, such as using pre-correlated look-up tables or maps—stored in the control means—correlating any one or more of the abovementioned inputs indicative of a condition of the engine with predicted $NO_X$ content of the exhaust gas.

The entire contents of any and all patents and references cited herein are incorporated herein by reference.

EXAMPLES

Although the invention is illustrated and described herein with reference to specific embodiments, the invention is not intended to be limited to the details shown. Rather, various modifications may be made in the details within the scope and range of equivalents of the claims and without departing from the invention.

1. Steady State SCR Evaluation

Steady-state selective catalytic reduction (SCR) activity tests were conducted in a quartz reactor of 24 inches in length, and uniformly heated by two tube furnace units of 12 inches length. Experiments were performed at a gas hourly space velocity of 30,000 $hr^{-1}$ utilizing catalyst dimensions of 1 inch diameter×1 inch length. All gas lines directly connected to the reactor were maintained at 130° C. by heating tape to prevent gas species adsorption on the walls of the gas line. Water vapor was provided by a water bomb, which was constantly maintained at 70° C.

Prior to reaching the catalyst bed, the feed gas was heated and mixed upstream in the reactor via an inert thermal mass. The temperature of the gas stream was monitored at the catalyst inlet, center of the catalyst bed, and at the outlet by k-type thermocouples. Reacted feed gas was analyzed by a FTIR downstream from the catalyst bed at a sampling rate of 1.25 $s^{-1}$. The composition of the inlet feed gas could be determined by sampling from a bypass valve located upstream of the reactor.

Steady-state SCR experiments were initially performed on catalyst samples that had been hydrothermally (HT) aged at 700° C. for 2 hours in the presence of air containing 4.5% $H_2O$. All steady state experiments were conducted using a feed gas of NO and $NH_3$ containing 350 ppm of NO, with an ammonia-to-NO (ANR) ratio of 1 (i.e., 350 ppm of $NH_3$). The remainder of the feed gas composition was as follows: 14% $O_2$, 4.6% $H_2O$, 5% $CO_2$, balance $N_2$. The steady-state $NO_X$ conversion was determined at catalyst bed temperatures of 150° C., 200° C., 250° C., 350° C., 450° C., 550° C., and 650° C.

Catalysts were then aged under lean-rich cycling conditions at 600° C. for 12 h. The lean portion of the cycle consisted of exposure to 200 ppm NO, 10% $O_2$, 5% $H_2O$, 5% $CO_2$ in $N_2$ for 5 seconds at a space velocity of 30,000 $h^{-1}$. The rich portion of the cycle consisted of exposure to 200 ppm NO, 5000 ppm $C_3H_6$, 1.3% $H_2$, 4% CO, 1% $O_2$, 5% $H_2O$, 5% $CO_2$ in $N_2$ for 15 seconds. After the aging, steady-state SCR experiments were performed as described above.

In FIG. 3, the $NO_X$ conversion efficiency is shown for embodiments of the present invention and a comparative example. Cu/SAPO-34, Cu/Nu-3 and Cu/SSZ-13, small pore molecular sieve catalysts according to embodiments of the invention, are shown after having undergone the above described hydrothermal aging treatment and lean/rich aging treatment, respectively. A comparative example showing Cu/Beta, a large pore molecular sieve catalyst, is also shown after both hydrothermal aging and lean/rich aging. As is evident, the small pore molecular sieve catalysts demonstrated enhanced $NO_X$ conversion efficiencies especially in the temperature window of 200 to 500° C.

2. NAC+SCR Experiments $NO_X$ adsorber catalyst (NAC) and SCR cores were initially hydrothermally aged at 750° C. for 16 hours in a 4.5% $H_2O$ in air gas mixture. Samples were then mounted in the same reactor setup described above with the NAC catalyst mounted directly in front of the SCR catalyst. The catalysts were aged at 600° C. for 12 hours under the lean-rich aging conditions described above (5 seconds lean/15 seconds rich).

The catalysts were then cooled to 450° C. under lean-rich cycling (60 seconds lean/5 seconds rich, same gas compositions). At 450° C., 25 lean-rich cycles were completed (60 seconds lean/5 seconds rich) with the last five cycles used to determine an average cycle $NO_X$ conversion for the catalyst. After the 25$^{th}$ cycle, the catalyst was held under the lean gas composition for 5 minutes. The catalyst was then cooled and evaluated at 400° C., 350° C., 300° C., 250° C., 200° C., and 175° C. following the aforementioned cycle procedure.

In FIG. 4, the $NO_X$ conversion efficiency is shown for embodiments of the present invention and two comparative examples. NAC+Cu/SAPO-34 and NAC+Cu/SSZ-13, small pore molecular sieve catalysts according to embodiments of the invention are shown after having undergone the above described lean/rich aging treatment. A comparative example showing NAC alone and NAC+Fe/Beta, a large pore molecular sieve catalyst, is also shown after lean/rich aging. As is evident, the small pore molecular sieve catalysts demonstrate enhanced $NO_X$ conversion efficiencies comparable to and/or better than NAC alone or NAC+Fe/Beta, especially in the temperature window of 250 to 450° C.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for using a catalyst comprising exposing a catalyst to at least one reactant in a chemical process, wherein the catalyst comprises copper and a small pore molecular sieve having a maximum ring size of eight tetrahedral atoms, the chemical process undergoes at least one period of exposure to a reducing atmosphere, the catalyst has an initial activity and the catalyst has a final activity after the at least one period of exposure to the reducing atmosphere, wherein the final activity is within 30% of the initial activity at a temperature between 200 and 500° C.

2. The method according to claim 1, wherein the catalyst has a final activity that is within 10% of the initial activity at a temperature between 200 and 500° C.

3. The method according to claim 1, wherein the catalyst has a final activity that is within 3% of the initial activity at a temperature between 250 and 350° C.

4. A method according to claim 1, wherein the chemical process is selected from the group consisting of selective catalytic reduction, catalyzed soot filter regeneration, and $NO_X$ trap regeneration.

5. The method according to claim 1, wherein the small pore molecular sieve is selected from the group consisting of aluminosilicate molecular sieves, metal-substituted aluminosilicate molecular sieves, and aluminophosphate molecular sieves.

6. The method according to claim 1, wherein the small pore molecular sieves is selected from the group of Framework Type consisting of: ACO, AEI, AEN, AFN, AFT, AFX, ANA, APC, APD, ATT, CDO, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG AND ZON.

7. A method according to claim 1, wherein the small pore molecular sieves containing a maximum ring size of eight tetrahedral atoms is selected from the group Framework Type consisting of LEV, ERI and DRR.

* * * * *